United States Patent [19]

Okamoto et al.

[11] Patent Number: 4,868,438
[45] Date of Patent: Sep. 19, 1989

[54] THREE-PHASE INDUCTION MOTOR

[75] Inventors: Kiyokazu Okamoto; Hiroshi Iijima; Tetsuo Endo; Yukio Miyamoto, all of Tokyo, Japan

[73] Assignee: NEC Corporation, Japan

[21] Appl. No.: 31,526

[22] Filed: Mar. 27, 1987

[30] Foreign Application Priority Data

Apr. 1, 1986 [JP] Japan .................................. 61-75154

[51] Int. Cl.$^4$ ............................................ H02K 17/00
[52] U.S. Cl. .................................... 310/166; 310/180; 310/261
[58] Field of Search ............... 310/166, 198, 184, 201, 310/261, 254, 179, 180, 264, 265, 216; 318/727

[56] References Cited

U.S. PATENT DOCUMENTS

| | | | |
|---|---|---|---|
| 3,515,919 | 6/1970 | Houtman | 310/166 |
| 3,979,618 | 9/1976 | Auinger | 310/198 |
| 4,127,787 | 11/1978 | Auinger | 310/198 |
| 4,163,915 | 8/1979 | Fong | 310/198 |
| 4,371,802 | 2/1983 | Morrill | 310/166 |
| 4,629,916 | 12/1986 | Oudet | 310/49 R |
| 4,755,702 | 7/1988 | Lijima et al. | 310/198 |

FOREIGN PATENT DOCUMENTS

| | | |
|---|---|---|
| 87100093.1 | 1/1987 | European Pat. Off. |
| 2349191 | 4/1974 | Fed. Rep. of Germany ...... 310/166 |
| 61-1884 | 1/1986 | Japan . |

Primary Examiner—R. Skudy
Attorney, Agent, or Firm—Ostrolenk, Faber, Gerb & Soffen

[57] ABSTRACT

A three-phase induction motor is subjected to countermeasure for the rotor and the stator in order to remove two harmonic components of the orders causing a torque ripple, among a plurality of harmonic components included in a magnetic flux generated in an air gap between a stator core and a rotor core. In the three-phase induction motor, conductor grooves of the rotor core are skewed by an electrical angle of $2\pi/n$ where n is the order of one of the harmonic components to be removed. In the stator, the number of slots (N) is selected so that an equation $N = l \times m \times q$ is satisfied, where $l$ = the number of poles, $m$ = the number of phase, and q is a non integer number representing the number of slots per pole per phase, and the stator winding pitch is determined according to the order of another harmonic component to be removed.

5 Claims, 3 Drawing Sheets

THREE-PHASE INDUCTION MOTOR

BACKGROUND OF THE INVENTION

The present invention relates to a three-phase induction motor and, more particularly, to a three-phase induction motor having a relatively low capacity e.g., a power output of 1 kW or less, which can smooth torque, and which is used as a servo motor.

An induction motor is structurally simple, inexpensive, strong, and hence has been widely used as a rough constant speed motor in many industrial fields. However, recently, when it is used together with a high speed microprocessor or a high speed semiconductor switching element, a strong potentiality as a wide range variable speed motor, e.g., servo motor, has been brought about by a new control technology, such as "vector control induction motor drive".

In the three-phase induction motor, magnetic flux (to be referred to as "air gap magnetic flux" hereinafter) generated in an air gap between a stator (or primary) core and a rotor (or secondary) core includes various harmonic components such as the 5th, 7th, 11th, 13th, 17th, . . . harmonic components, thereby generating magnetic flux variations. For this reason, the harmonic components, especially the 5th and 7th harmonic components, adversely affect the operation of the motor by generating a torque ripple, (or a variation of torque). In order to remove the torque ripple, a conductor groove of the rotor core is generally skewed.

Conventionally, based on a principle that skew smoothes the air gap magnetic flux, skew is performed by one slot pitch of the stator as shown in FIG. 1. In FIG. 1, reference numeral 1 denotes a stator core; 2, stator slots; 3, a rotor core; 4, skewed conductor grooves; and 5, rotor bars buried in the conductor grooves 4, which constitute a secondary circuit. FIG. 1 is a schematic view in which only a portion of the circular stator and the rotor are developed.

With this arrangement, the slots 2 and the conductor grooves 4 do not completely oppose each other, and a magnetic flux passage between the stator and the rotor is always provided. Therefore, magnetic flux variations in the air gap become small, and the torque ripple caused by the stator slots 2 is reduced.

On the other hand, in order to reduce variations in the air gap magnetic flux itself, the number of slots 2 provided to the stator is increased, or an opening of the slot 2 is closed.

As described above, various countermeasures have been taken to prevent the torque ripple. However, since no countermeasure directly affects the harmonic components which cause the torque ripple, the torque ripple cannot be completely removed.

For example, when the conductor grooves 4 of the rotor are conventionally skewed, the harmonic components of relatively higher orders (e.g., the 11th or higher) can be removed. However, for example, the 5th and 7th harmonic components, which are largely responsible for adverse effects, cannot be removed and often generate the torque ripple.

In addition, a method of increasing the number of slots 2 of the stator to smooth torque is possible and effective for a large-sized motor. However, in the case of a small-sized motor, the number of slots 2 of the stator cannot be largely increased because of manufacturing limitations.

Furthermore, a method of closing an opening of the slot 2 leads to complex manufacturing steps and hence can be adopted only to a motor in a limited field.

SUMMARY OF THE INVENTION

It is, therefore, an object of the present invention to provide a three-phase induction motor, which can be manufactured by simple manufacturing steps, which generates less torque ripple, and which has the characteristics of a servo motor.

According to the three-phase induction motor of the present invention, two countermeasures are adopted. According to the first countermeasure, in order to remove the nth (e.g., the 7th) harmonic component, (i.e., one of those which largely adversely affect the motor operation, of the harmonic components included in air gap magnetic flux and causes torque ripple, a conductor groove of a rotor core is skewed by an electrical angle of $2\pi/n$, where n is the order of the harmonic component to be removed.

When a method of the present invention is adopted, the harmonic components of the orders, which largely adversely affect, of the harmonic components included in the air gap magnetic flux are removed. That is, when the conductor grooves of the rotor core are skewed by the electrical angle of $2\pi/n$, i.e., 2/n of an interval between magnetic poles, voltage vectors induced by the nth harmonic component in one rotor bar have opposite directions and are cancelled with each other, so that a current of the nth harmonic component no longer is supplied.

By skew of the conductor grooves of the rotor described above, the torque ripple is largely reduced, but the torque ripple caused by the harmonic component of another order (e.g., the 5th harmonic component) which is not removed sometimes remains to pose a problem. A countermeasure for this problem is taken by a manner of selecting the number of slots (grooves) of the stator core and selecting the pitch of the stator winding.

DESCRIPTION OF THE PREFERRED EMBODIMENT

An embodiment of the present invention will now be described in detail with reference to the accompanying drawings.

Figure 1:
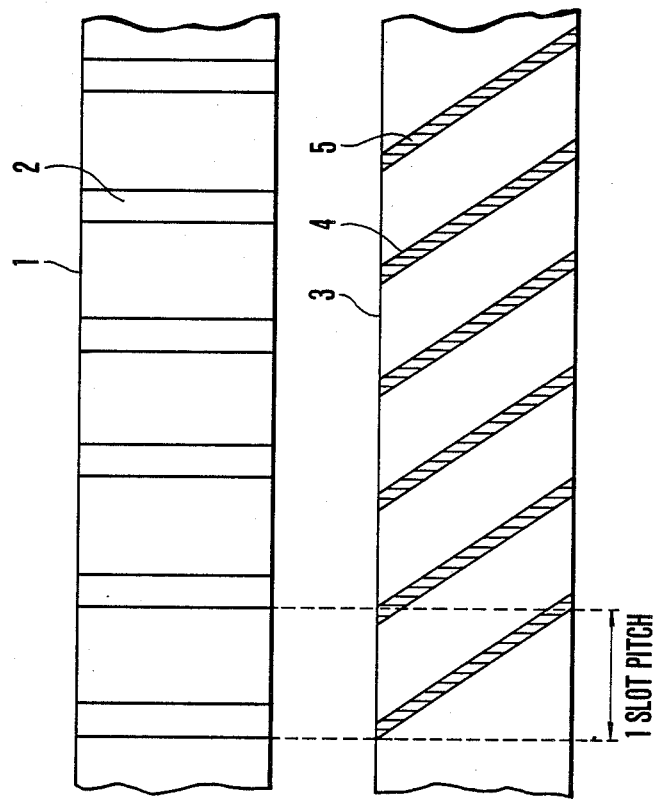
FIG. 1 is a schematic view showing a relationship between a stator and a rotor having skewed grooves in a conventional induction motor.
Figure 2:
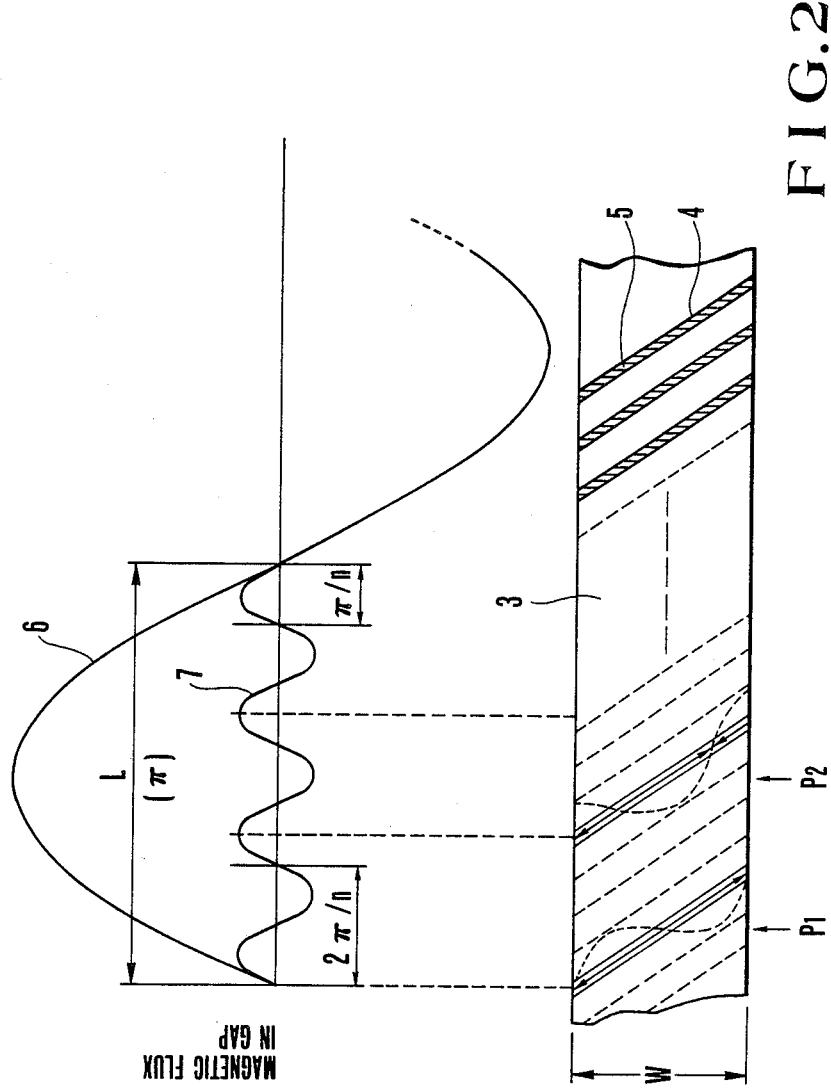
FIG. 2 is a schematic view of an embodiment according to the present invention.

FIG. 2 is a schematic view for explaining an embodiment of the present invention, and showing a relationship between skew of conductor grooves of a rotor and a waveform of an air gap magnetic flux. FIG. 2 shows a case wherein an influence of the 7th harmonic components included in the air gap magnetic flux are removed, and a description thereof will be made with reference to a 2-pole motor.

In FIG. 2, reference numeral 6 denotes a fundamental waveform of the air gap magnetic flux; and 7, the 7th harmonic component waveform thereof. Reference symbol L denotes a magnetic pole interval; and W, a rotor core width. The magnetic pole interval L is a half cycle width of the fundamental waveform 6, i.e, $\pi$ in the case of a 2-pole motor since an electrical angle equals to a mechanical angle. As shown in FIG. 2, assuming that the harmonic component order is n (n=7 in this case since the 7th harmonic component is in question in this embodiment), conductor grooves 4 of rotor core 3 are skewed by one cycle of the harmonic component, i.e., $2\pi/n$ of the electrical angle.

As a result, the nth (7th) harmonic component voltages are induced at, e.g., points P1 and P2 of rotor bars (secondary circuit) 5 buried in the conductor grooves 4, and the induced voltage vectors have a direction and a magnitude represented by arrows. Therefore, the nth (7th) harmonic component current at the rotor bar 5 is cancelled and hence is no longer supplied. That is, in an induction motor having a rotor of the above arrangement, no torque ripple by the nth harmonic component is generated.

Note that in the above embodiment, the description has been made with reference to the case wherein the harmonic component to be removed has order n=7. However, the present invention is not limited to this embodiment, and values of n may be determined by selecting other harmonic components, to be removed, having a large adverse influence. For example, a desired harmonic component to be removed may be selected from the 5th, 7th, 11th, 13th, 17th, ... harmonic components. In addition, the present invention can be applied to, e.g., a 2-, 4-, or 6-pole motor irrespective of the number of poles.

Another countermeasure for reducing the torque ripple will be described below, wherein the number of slots of the stator core is selected so that the number of slots per pole per phase of the stator core is non-integer, wherein a three-phase balanced winding condition is satisfied, and wherein the pitch of the stator winding is determined by the rth harmonic component, where r≠n, thereby removing the rth harmonic component.

The number of slots of the stator core is determined by the following equation:

$$N = l \times m \times q,$$

where N=the number of slots of the stator core; l=the number of poles; m=the number of phases; and q=the number of slots per pole per phase; N being selected so that q is a non-integer.

In addition, assuming that the order of the harmonic component having a great adverse influence and therefore is to be removed is r, a winding pitch s of the stator is selected in accordance with the following equations:

$$s = (r-t)/r \text{ (in the case of a fractional pitch winding);}$$
or
$$s = r/(r+t) \text{ (in the case of a long-pitch winding)}$$

where t is an odd number.

The number N is determined to satisfy the above relationships and to obtain a three-phase balanced winding.

Figure 3:
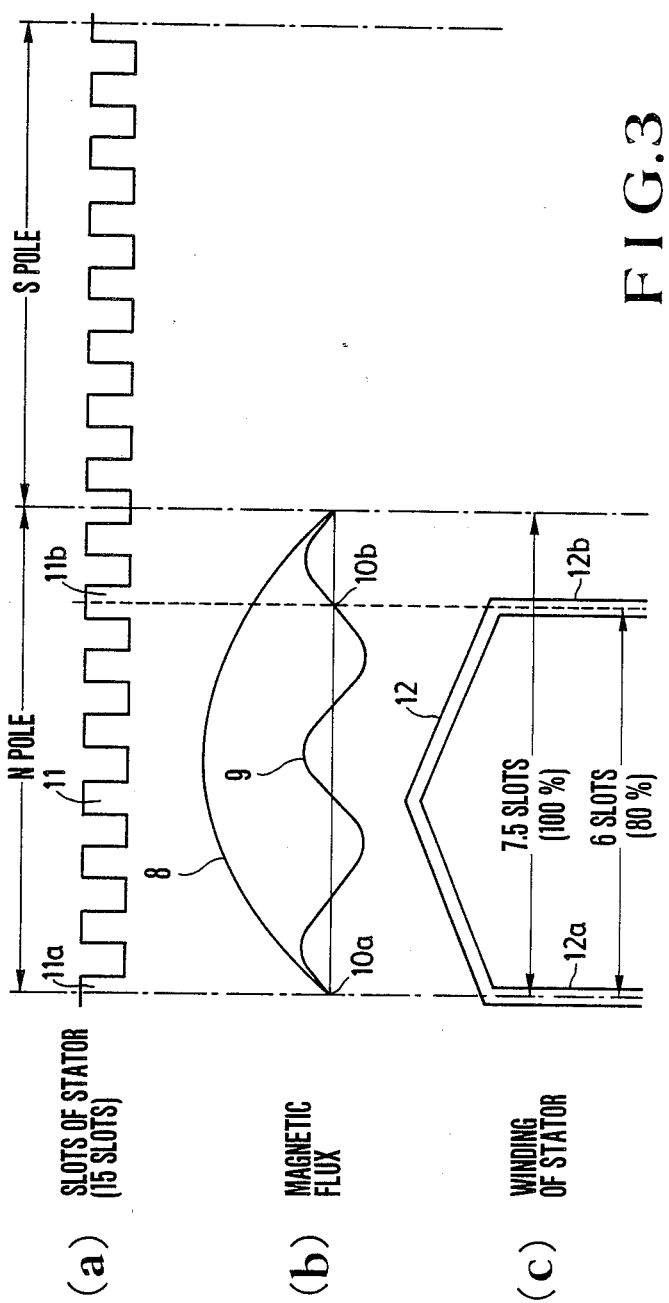
FIGS. 3(a) to 3(c) are schematic views showing a method of removing harmonic component torque according to a further aspect of the present invention.

FIGS. 3(a) to 3(c) are views for explaining the countermeasure of selecting the number of slots of the stator core. FIGS. 3(a) to 3(c) show the case wherein an influence of the 5th harmonic component is removed and the number of slots of the stator core becomes a minimal value so as to realize harmonic removal in a small-sized induction motor.

More specifically, in the case shown in FIGS. 3(a) to 3(c), the number of poles (l)=2, the number of phases (m)=3, the number of slots per pole per phase (q)=2.5 (that is, a non-integer), the number of slots of the stator core (N)=2×3×2.5=15, and the stator winding pitch t=1 (a fractional pitch winding).

FIG. 3(a) is a schematic view of the stator slots 11; FIG. 3(b) show a magnetic flux distribution showing a fundamental wave 8 and the 5th harmonic component 9 to be removed; and FIG. 3(c) shows a winding 12 of the stator, wherein left and right conductors 12a and 12b of the winding 12, as shown in FIG. 3(c), are fitted into slots 11a and 11b shown in FIG. 3(a), respectively.

This example shows the case wherein the order of the harmonic component to be removed r=5 and the stator winding pitch s=(r−1)/r=4/5=0.8. That is, since the number of slots per pole is 15/2=7.5, the pitch of the winding in terms of the number of slots is 7.5 slots ×0.8=6 slots, as shown in FIG. 3(c). With this arrangement, the left and right conductors 12a and 12b of the winding 12 are positioned at a starting node 10a and the fourth node 10b of the 5th harmonic component 9 as shown in FIGS. 3(b) and 3(c), so that the effect of the 5th harmonic component 9 is not induced. In each of the other windings, not shown, since voltages induced by the fifth harmonic component in left and right conductors thereof are opposite to each other and therefore cancelled by each other, the fifth harmonic component totally has no effect over all the windings. Accordingly, ripple due to the fifth harmonic component is removed.

It will be examined below whether the three-phase balanced winding can be realized in the case wherein the number of entire slots 11, that is N, is 15, and windings are provided at every 6 slots.

Whether the three-phase balanced winding is possible or not is determined by the following equation.

Assume that a value obtained by dividing the N, by a greatest common divisor of N and P is $N_0$, where P denotes the number of pole pairs, that is 1/2, and the number of phases is m. When $N_0/m$=integer, a two-layer winding is possible, and when $N_0/2m$=integer, both single- and two-layer windings are possible. But when $N_0/m$ is not an integer, a three-phase balanced winding cannot be realized, so that such a number of slots cannot be adopted.

In this example, $N_0$=15 because N=15 and P=1, and $N_0/m$=15/3=5 because the number of phases m=3, so that integer is obtained to realize the three-phase balanced winding. That is, this example is a design example which can be realized. When the stator is designed as described above, an influence of the rth harmonic component (the 5th harmonic component in this example) is removed. Therefore, when skew of the conductor grooves of the rotor core, the number of slots of the stator, and the winding pitch are determined according to the present invention, influences of the nth and rth harmonic components can be eliminated at the same time.

Note that in the case wherein the harmonic component countermeasure is taken to both the rotor and the stator, if the higher (e.g., the 7th) harmonic component is removed at the rotor and the lower (e.g., the 5th) harmonic component is removed at the stator, skew can be performed at a small anmle to facilitate manufacture of the rotor, resulting in a great advantage.

As has been described above, according to the present invention, the harmonic components of the orders which largely adversely affect to generate the torque ripple can be selectively and directly removed, thereby realizing a three-phase induction motor with less torque ripple. Therefore, a small-sized driving source of a servo mechanism which requires a torque smoothness can be provided.

What is claimed is:

1. A three-phase induction motor having a stator core and a rotor core, wherein a plurality of harmonic components are removed to minimize torque ripple, said plurality of harmonic components that are removed being included in a magnetic flux generated in an air gap between said stator core and said rotor core, said motor comprising:

(a) a plurality of conductor grooves formed on a surface of said rotor core, said conductor grooves being skewed by an electrical angle of $2\pi/n$, where n is the order of a first one of said plurality of harmonic components which is to be removed;

(b) a plurality of slots formed on a surface of said stator core so as to satisfy the condition $$N = l \times m \times q,$$

where N=the number of said slots; l=the number of poles; m=the number of phases; and q=the number of said slots per pole phase; N being selected so that q becomes a non-integer; and a stator winding provided in said slots so as to satisfy both a three-phase balanced winding condition and a condition represented by one of the following equations:

$$s = (r-t)/r;$$

$$s = r/(r+t),$$

where t is an odd number, s is the pitch of said stator winding and r is the order of a second one of the plurality of harmonic components to be removed; thereby removing both said first and said second harmonic components of the orders n and r, respectively, to minimize torque ripple in said motor.

2. A motor according to claim 1, wherein t=1.

3. A motor according to claim 1, wherein n=7 and r=5.

4. A motor according to claim 1, wherein said stator winding is a fractional pitch winding, and satisfies said equation $s=(r-t)/r$.

5. A motor according to claim 1, wherein said stator winding is a long-pitch winding, and satisfies said equation $s=r/(r+t)$.

* * * * *